Aug. 6, 1929.  F. P. RYDER  1,723,492
STRING BEAN HARVESTER
Filed April 10, 1928    3 Sheets-Sheet 1
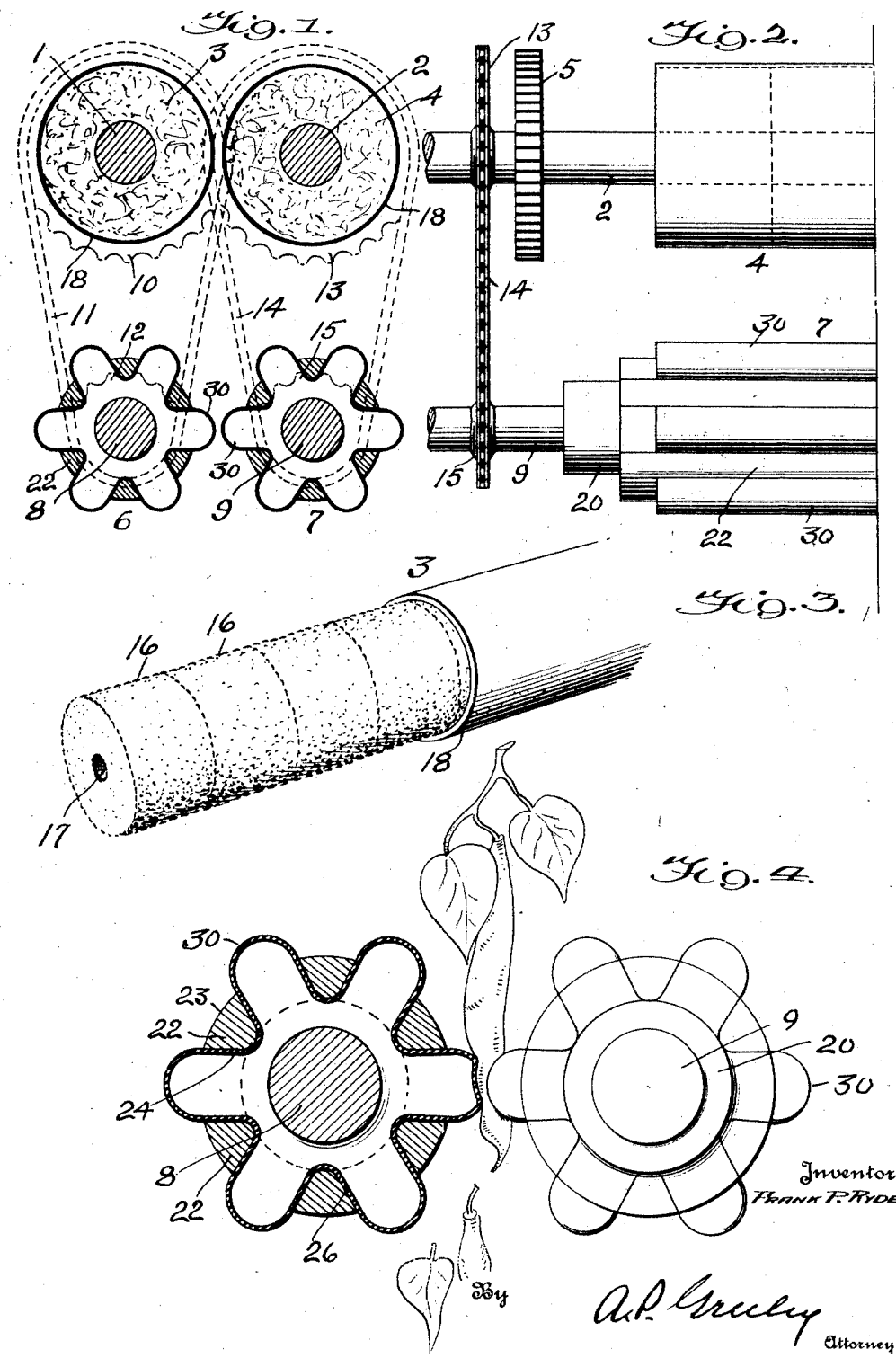

Aug. 6, 1929.  F. P. RYDER  1,723,492
STRING BEAN HARVESTER
Filed April 10, 1928   3 Sheets-Sheet 2
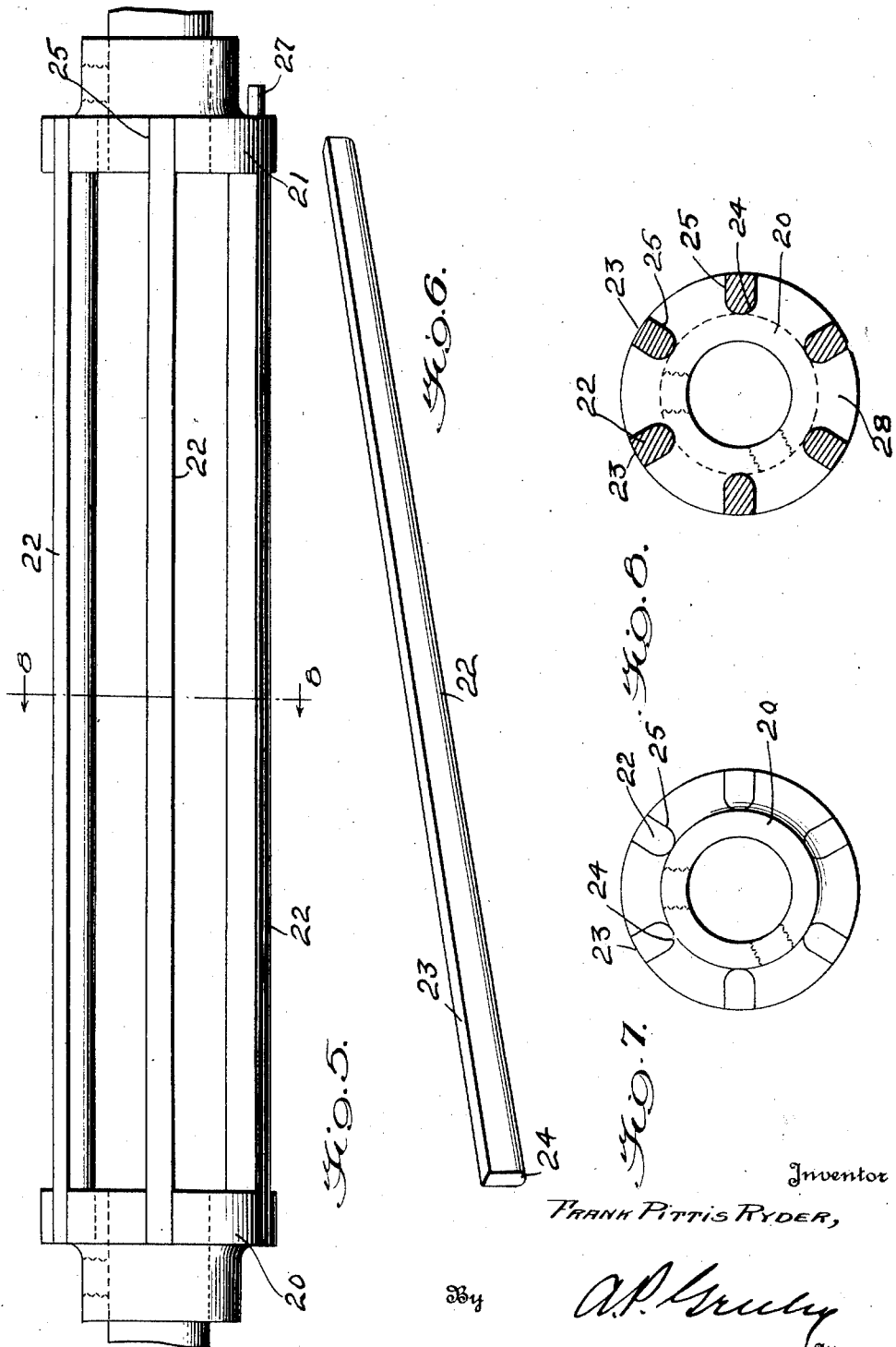

Aug. 6, 1929.　　　F. P. RYDER　　　1,723,492
STRING BEAN HARVESTER
Filed April 10, 1928　　　3 Sheets-Sheet 3
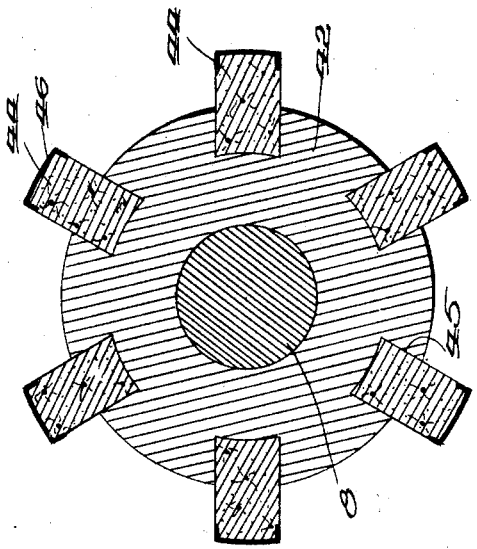
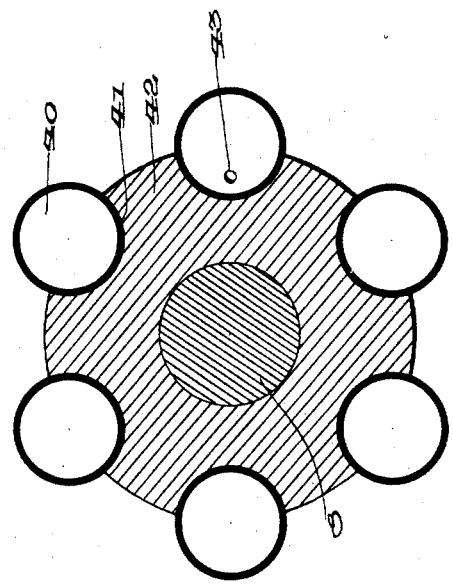
Inventor
FRANK P. RYDER,
By A. P. Greeley
Attorney Patented Aug. 6, 1929.

1,723,492

UNITED STATES PATENT OFFICE.

FRANK PITTIS RYDER, OF NIAGARA FALLS, NEW YORK.

STRING-BEAN HARVESTER.

Application filed April 10, 1928. Serial No. 268,819.

My invention relates to string bean harvesters and has for its object to provide means by which the bushes or vines on which the string beans are grown may be fed into the harvester and the string beans stripped or separated from the stalks and leaves. A further object of my invention is to provide a combination of gripping or feeding rolls with stripping rolls which will effectively strip the bean pods from the bushes or vines without injury to the bean pods. A further object of my invention is to provide a particular construction of gripping or feeding rolls and a particular construction of stripping rolls which will be particularly adapted to the stripping of string beans from the bushes or vines either separately used or used in combination.

With the objects above indicated and other objects hereinafter explained in view my invention consists in the construction and combination of elements hereinafter described and claimed.

Referring to the drawings:
Figure 1 is a cross sectional view on line 1—1 of Figure 2 of gripping and stripping rolls embodying my invention arranged in operative position.

Figure 2 is a side view of the end portions of the gripping and feeding rolls shown in Figure 1.

Figure 3 is a perspective view of a gripping roll partly completed.

Figure 4 is a view partly in cross section of the stripping rolls in operation on string beans.

Figure 5 is a side view of the cage of a stripping roll.

Figure 6 is a perspective view of one of the longitudinal bars of the cage of a stripping roll.

Figure 7 is an end view of the cage shown in Figure 5.

Figure 8 is a cross section of the cage on line 8—8 of Figure 5.

Figure 9 is a cross sectional view of a modified form of stripping roll, and

Figure 10 is a cross sectional view of another modified form of stripping roll.
In the drawings, 1 and 2 indicate parallel shafts carrying respectively gripping rolls 3 and 4 so arranged that their peripheries are nearly in contact. The two shafts 1 and 2 are provided with intermeshing gears 5 so that they will be rotated together by any convenient power applied to one of them as described in my application No. 232,119, filed Nov. 9, 1927. These gripping rolls are intended to grip bean bushes as they are fed to them by hand or otherwise and move them towards stripping rolls by which the string beans are stripped or pulled off from the bushes. 6 and 7 indicate the stripping rolls below the gripping rolls arranged to rotate at a peripheral speed somewhat greater than the peripheral speed of the gripping rolls so that by reason of this difference in peripheral speed the bean pods will be pulled away from the more slowly moving bushes.

The shafts 8 and 9 of the stripping rolls are parallel and so spaced apart that the peripheries of the rolls will be in contact or nearly so and these stripping rolls are preferably driven from the shafts of the gripping rolls. In the arrangement shown shaft 1 carries a sprocket 10 which by means of sprocket chain 11 engaging sprocket 12 on shaft 8 drives this shaft and its stripping roll 6 and shaft 2 carries sprocket 13 which by means of sprocket chain 14 engaging sprocket 15 in shaft 9 drives this shaft and its stripping roll 7, the arrangement being the same as in my application No. 232,119, above referred to.

The gripping rolls 3 and 4, in order to grip the bean stalks which vary considerably in size and to permit the tender bean pods to pass between them must be sufficiently resilient to grip a stalk with considerable force and yet be capable of so yielding as to permit a bean pod to pass without being bruised. That is, the material of the roll must be such that the resistance to compression will be comparatively slight and as nearly as possible constant to whatever extent the compression may be carried. The stripping rolls in order to pull a bean pod with sufficient force to break the brittle stem connecting it with the stalk which is being retarded between the gripping rolls and yet slide over a stalk still held between the gripping rolls or a bean still held at one by the gripping rolls, without breaking or injuring it. Rolls of solid rubber or of the composition used in the printing art for inking rollers are not suitable for use as gripping rolls or stripping rolls for the reason that such rollers, while offering slight resistance to slight compression, offer greatly increased resistance to greater compression. To meet these requirements the gripping rolls, and, if desired, the stripping rolls are formed by cutting discs from rubber sponge, that is, rubber which has, before vulcanizing, been mixed with baking powder or like material adapted to give off gas when heated, and then baked so as to produce a highly porous or spongy mass of great resilience. As this springy rubber cannot be baked conveniently, if at all, so as to form a satisfactory roll it is necessary to cut discs 16 from a mass of the finished material, perforate them centrally as indicated at 17, and fit them on shaft 1 or 2 and, in order that the roll may have a smooth peripheral surface not liable to be torn as it slips over stalks or beans, a cover 18 of thin pure gum in the shape of a tube is drawn over the discs 16. The rolls thus formed yield evenly to relatively slight compression, and will exert a uniform pull on objects of greatly varying thickness without injury to the rolls or to the stalks or the bean pods.

While rolls constructed as thus described may be used as stripping rolls as well as for gripping rolls, I prefer to form the stripping rolls as shown in Figures 4 to 8, inclusive. The stripping rolls, shown in these figures comprise hubs 20 and 21 near opposite ends of the shaft 8 (or 9) which is cut away between these hubs having secured between them longitudinal ribs 22 the outer faces 23 of which are in line with the peripheries of the hubs 20 and 21. The inner faces 24 of these longitudinal ribs are suitably rounded. These longitudinal ribs may be secured at their ends to the hubs 21 and 22 in any convenient manner. As shown in Figures 5, 7 and 8, the hubs 21 and 22 are provided with peripheral recesses 25 in which the ends of the longitudinal ribs are received and secured by welding.

Within the cage formed by the hubs 20 and 21 and the longitudinal ribs 22 is arranged a tube 26 of soft rubber such as is used for inner tubes of pneumatic automobile tires, closed at its ends and having at one end, preferably the end adjacent to hub 21, a suitable air inlet valve as shown at 27 extending outward through an opening 28 in this hub whereby air under pressure may be introduced into this tube 26. When air is forced into tube 26 portions of it as indicated at 30 are forced outward beyond the outer faces of the longitudinal ribs forming projections which as the stripping rolls 6 and 7 are rotated act as shown in Figure 4 to grip the bean pods between them with a pressure depending upon the air pressure applied.

By varying the air pressure the grip of the projections 30 on the beans may be so regulated as to secure the degree of pressure upon the bean pods which will be best adapted to give the pull necessary to strip the pod from the stalks without injuring the tenderest of the bean pods.

In Figures 9 and 10 I have shown modified forms of stripping rolls each of which is adapted to provide contacting surfaces of the character above described, that is, surfaces which will yield evenly to relatively slight compression and will exert a uniform pull on objects of greatly varying thickness without injury to the rolls or the stalks or the bean pods. In Figure 9 these contacting surfaces consist of a series of inflatable tubes 40 extending longitudinally of the rolls and carried in suitably shaped recesses 41 suitably spaced apart on the periphery of a cylinder 42 carried on shaft 8 (or 9). These tubes may be each provided with a separate air valve or two or more of the group of tubes 40 may be connected to a single tube provided with air valve 43.

Instead of the inflatable air tubes 40 I may use, as shown in Figure 10, longitudinal bars 44 of the rubber sponge above described in reference to Figures 1, 2, and 3, these bars 44 being carried in suitably shaped recesses 45 in the periphery of cylinder 42, these bars 44 being preferably provided on the outer or wearing face with a protective covering 46 of soft rubber or the like.

Having thus described my invention, what I claim is:

1. In means for separating string beans from the plants on which they are grown, a pair of stripping rolls each comprising an expansible tube so arranged that portions of the tubes of the two rolls may be caused to contact to grip the beans between them, said tubes being adapted to be expanded by air pressure to grip on the beans.

2. In means for separating string beans from the plants on which they are grown, a pair of stripping rolls each comprising a cage having openings in its periphery and an expansible tube within the cage adapted by air pressure to cause portions thereof to be forced outward through the openings in the cage.

3. In means for separating string beans from the plants on which they are grown, a pair of stripping rolls each comprising heads adapted to be secured on shafts, longitudinal bars extending between said heads so secured about their peripheries as to leave openings between them, and a tube of expansible material within said cage adapted to be expanded to cause portions thereof to be projected through the openings between the longitudinal bars.

4. A resilient roll comprising an inflatable tube, a cylindrical cage surrounding the inflatable tube having openings in its periphery, the tube being so inflated that portions thereof project through said openings beyond the periphery of the cage.

5. In means for separating string beans from the plants on which they are grown, a pair of stripping rolls so arranged as to grip the beans between their peripheral surfaces, one of the stripping rolls comprising an inflatable tube and means for holding it expanded by fluid pressure.

6. In means for separating string beans from the plants on which they are grown, a pair of stripping rolls so arranged as to grip the beans between their peripheral surfaces, and each comprising an inflatable tube and means for holding it expanded by fluid pressure.

7. In means for separating string beans from the plants on which they are grown, a pair of stripping rolls so arranged as to grip the beans between their peripheral surfaces, one of the stripping rolls comprising an inflatable tube and means for holding it expanded by fluid pressure, in combination with a pair of gripping rolls having their peripheral surfaces adapted to grip the plants and so arranged as to grip them in advance of the action of the stripping rolls.

In testimony whereof, I hereunto affix my signature.

FRANK PITTIS RYDER.